United States Patent
Palviainen

(10) Patent No.: US 6,385,178 B1
(45) Date of Patent: May 7, 2002

(54) DIRECT DATA ACCESS FROM A DIGITAL MOBILE NETWORK TO DATA NETWORKS

(75) Inventor: Keijo Palviainen, Helsinki (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/066,485
(22) PCT Filed: Oct. 30, 1996
(86) PCT No.: PCT/FI96/00577
§ 371 Date: Aug. 21, 1998
§ 102(e) Date: Aug. 21, 1998
(87) PCT Pub. No.: WO97/16933
PCT Pub. Date: May 9, 1997

(30) Foreign Application Priority Data

Oct. 30, 1995 (FI) .................................................. 955189

(51) Int. Cl.[7] .................................................. H04Q 7/00
(52) U.S. Cl. .................................... 370/328; 455/445
(58) Field of Search ............................. 370/328, 329, 370/338, 337, 340, 341, 351, 352, 397, 399, 522, 389, 392; 455/445, 426, 560

(56) References Cited

U.S. PATENT DOCUMENTS

| | | | | |
|---|---|---|---|---|
| 5,533,019 A | * | 7/1996 | Jayapalan | 370/352 |
| 5,590,133 A | * | 12/1996 | Billstrom et al. | 370/349 |
| 5,793,762 A | * | 8/1998 | Penners et al. | 370/328 |
| 5,802,465 A | * | 9/1998 | Hamalainen et al. | 455/403 |
| 5,889,770 A | * | 3/1999 | Jokiaho et al. | 370/328 |
| 5,896,369 A | * | 4/1999 | Warsta et al. | 370/338 |
| 6,052,369 A | * | 4/2000 | Hamalainen et al. | 370/389 |

FOREIGN PATENT DOCUMENTS

| | | |
|---|---|---|
| FI | 934115 | 3/1995 |
| WO | WO 95/08900 | 3/1995 |
| WO | WO 95/21492 | 8/1995 |

OTHER PUBLICATIONS

Hamailainen, a method and apparatus for transmitting a packet data in a mobile network, Jul. 1995, WO 95/20283, p. 1–27.*

Jokiaho, updating location for a packet data service in a mobile system, Oct. 19, 1995, WO 95/28063, p. 1–27.*

1992 CCITT Blue Book, vol. 110, "Data Communication Over the Telephone Network, Support of Data Terminal Equipments with V—Series Type Interfaces by an Integrated Services Digital Network".

1993 CCITT Blue Book, vol. 24, "Data Communication Over the Telephone Network, List of Definitions for Interchange Circuits Between Data Terminal Equipment (DTE) and Data Circuit—Terminating Equipment (DCE)".

(List continued on next page.)

Primary Examiner—Wellington Chin
Assistant Examiner—Steven Nguyen
(74) Attorney, Agent, or Firm—Altera Law Group, LLC

(57) ABSTRACT

The invention relates to a direct data access (DDA) from a digital mobile network to a data network in a centralized manner in a first mobile switching center (MSC2). Another switching center (MSCI) is arranged to route a mobile data call, addressed to the centralized DDA, to MSC2 as a digital call according to a bearer service (UDI) supported by the mobile network. The interworking function of the routed data call are divided between the MSCs. MSC2 comprises a first interworking function (IWF2) that provides the adaptation functions required by the centralized DDA and the digital bearer service. MSC1 comprises a second interworking function (IWFI) providing the adaptation functions required by the radio connection and the digital bearer service.

20 Claims, 4 Drawing Sheets

OTHER PUBLICATIONS

Mouly & Pautet, The GSM System for Mobile Communications.

1995 CCITT Blue Book, ETS 300 356–1, "Integrated Services Digital Network (ISDN); Signalling System No, 7; ISDN User Part (ISUP) Version 2 for the International Interface; Part 1; Basic Services".

1996 CCITT Blue Book, ETS 300 403–1, Integrated Services Digital Network (ISDN); Digital Subcriber Signalling System No. One (DDSSI) Protocol; Signalling Network Layer for Circuit—Mode Basic Call Control; Part 1: Protocol Specification.

1990 CCITT Blue Book, ETS 300 102–1, Integrated Services Digital Network (IDDN); User—Network Interface Layer 3 Specifications for Basic Call Control.

A copy of the International Search Report.

* cited by examiner

DIRECT DATA ACCESS FROM A DIGITAL MOBILE NETWORK TO DATA NETWORKS

FIELD OF THE INVENTION

The present invention relates to implementing direct data access from a digital mobile network to data networks, such as packet networks or local area networks (LAN).

BACKGROUND OF THE INVENTION

Mobile systems have been developed due to the need to enable people to move away from desktop telephone sets and to reach people even when they are outside a certain location. As automation becomes a permanent part of the working environment, people outside offices feel the need to use a computer anywhere and to be able to connect from any place to any place. Therefore it seems inevitable that mobile systems providing speech services develop towards data services.

Computer technology makes it possible to produce lightweight portable equipment with a better processing capacity, storage capacity and user friendliness. This development of computers has made it technically possible and economically reasonable to provide mobile data services. In such cases the user has mostly likely a mobile telephone for speech traffic, wherefore the best way to provide data transmission is to perform it via the mobile system to great extent in the same way as data transmission via a conventional telephone network.

The introduction of digital mobile systems, such as the Pan-European mobile system GSM, signifies a breakthrough in supporting mobile data transmission in general-purpose cellular networks. Since the GSM is an entirely digital system and operates according to the general principles of the ISDN (Integrated Services Data Network), the GSM is naturally capable of transferring data. As regards the type of the data network, the GSM does not represent a dedicated transmission network but an access network. In other words, the purpose of data transmission via the GSM is to provide access to the actual data networks.

The GSM network provides a great number of services to the subscribers. In addition to speech and emergency call services, the GSM network supports all types of low-rate data transmission services that the present data transmission offers. The only limitation results from the capacity of the radio interface that restricts the data rate to 9.6 kbit/s.

Therefore a modern digital mobile system, such as the GSM, can be used for connecting any data terminal, such as a remote-work station, to a computer or a desired data network, such as a LAN. FIG. 1 illustrates different known methods of realizing such a data link. A terminal equipment TE generally consists of a conventional work station (e.g. a portable PC) that is connected to the data interface of the mobile station MS. The mobile network (PLM) typically requires, both in the terminal equipment interface (MS) and in the network interface (mobile switching centre MSC), a special adapter for adapting an internal data link of the PLMN to the terminal equipments and/or to other data links/transmission systems, such as the PSTN, LAN or PSDN. The adapter connected to the MS is generally called a terminal adapting function (TAF) and the adapter provided at the network end is called an interworking function (IWF). In the GSM mobile network such an interworking function is typically situated in connection with the MSC.

In such a network configuration, the TE may have a data communication via the radio path with an IWF placed in connection with the MSC, and thereby with a host computer CPU connected to another transmission network. The IWF may comprise for example a data modem MOD1 that sets up a modem connection via the public switched telephone network PSTN to another data modem MOD2 or MOD3. The other data modem may be connected directly to the terminal equipment or to the computer CPU in the same way as modem MOD2. However, this other modem is often connected to a LAN server connected to the LAN, the server being used to establish a remote connection to the LAN. Via the LAN it is in turn possible to establish a connection for example to a desired computer HOST. The problem of the PSTN modem connection is, however, the generally low transfer rate and poor bit error ratio. In such a case, the bit rate and the bit error ratio of the entire data connection are also in accordance with the PSTN and therefore of clearly lower quality than what the GSM network can offer, for example.

The solution to this problem is a direct data access from the MSC to the data network. In such a case, the IWF provides an interface to which it is possible to connect the external devices, which in turn provide a gateway to the current data network. Such external devices include for example LAN servers that operate as a gateway to LANs, and PAD devices that operate as a gateway to packet networks. A PAD device (Packet Assembly/Disassembly) converts the asynchronous characters (that are used in the PLMN) into data packets (employed in the packet network) and vice versa. These external devices that do not belong to the MSC hardware but to the networks are denoted in the present application with the common name DDA (Direct Data Access) devices.

In digital mobile networks, the functions of the IWF generally also include various rate adaptations and error correcting transmission protocols that must always be carried out by the MSC in the area of which the MS is currently located. For example in the GSM system rate adaptations (RA) and a radio link protocol (RLP) are defined. The RLP is a data transmission protocol wherein error cancellation is based on the retransmission of deteriorated frames after a request from the receiving party. The RLP spans from the TAF of the MS to the IWF. The RA and RLP adaptations of each call must be carried out in the MSC currently serving the mobile station. Therefore each MSC in the present mobile networks must have a connection to each DDA device and from there to each data network. This is not a problem when the data networks are large in size and their number is small. Problems occur when private local area networks or packet networks of companies are to be connected to a mobile network. Assume for example that a company LAN is situated physically within the area of one MSC 1 (for example in Tampere in Finland) and it can easily be provided with a DDA. If however the company personnel roams also within other MSC areas (for example in Helsinki), the DDA to the company LAN must be implemented separately in each MSC. This has proved to be very difficult and expensive both for the network operators and the client companies. This arrangement further fails to allow the use of a direct data access when the mobile subscribers are roaming in another mobile network, for example in Sweden.

SUMMARY OF THE INVENTION

The object of the present invention is to provide a direct data access from a mobile network to data networks in such a way that it would not be necessary to introduce the data access of each data network separately to each of the switching centres in the mobile network, but there is a centralized data access in one of the network. switching centres.

This is achieved with an arrangement for providing a direct data access from a digital mobile network to a data network, such as a packet network or a local area network. The arrangement is characterized according to the invention by a direct data access to a data network implemented in a centralized manner in a first switching centre of the mobile network, a directory number allocated to the direct data access, a second switching centre arranged to route a data call, made from a mobile station situated within the service area of the second switching centre to said directory number, to said first centre as a digital data call according to a bearer service supported by the mobile network, interworking functions for said routed data call being divided between the first and the second switching centre in such a way that said first switching centre comprises a first interworking function that provides the adaptation functions required by said centralized data access and said digital bearer service, and said second switching centre comprises a second interworking function that provides the adaptation functions required by a data link established over the radio path and the adaptation functions required by said digital bearer service.

In the invention, the adaptation functions of a conventional network termination that implements a direct data access to a data network are divided into two parts: 1) the normal adaptation functions of a mobile network, such as rate adaptation or transmission protocol, and 2) adaptation functions that provide a data access for a DDA device of a data network. The former functions are placed in the serving switching centre of the mobile station. The latter functions are placed in the switching centre provided with the centralized DDA to the data network. The connection between these two functions employs a bearer service of the mobile network supported by at least a majority of the mobile switching centres. In the preferred embodiment of the invention, this bearer service is unrestricted digital information (UDI) which is defined in most digital mobile networks for ISDN connections. In practice the UDI bearer service is applied in such a way that a data call is routed as a UDI call from the serving switching centre to the switching centre provided with the centralized DDA. The invention has the advantage that the first adaptation function according to the invention and the associated routing of the data call can be realized at any switching centre, i.e. a switching centre of any manufacturer or a switching centre located in any network supporting the UDI bearer service or any other selected bearer service. The DDA adaptation functions provided in the other switching centre will adapt the UDI data call to the DDA device of each data network. Thus, one centralized DDA in one mobile switching centre can provide access to a data network from any other switching centre supporting the UDI bearer service.

From the serving switching centre point of view, the data call according to the invention is a normal asynchronous data call using the UDI bearer service. The call is routed to the other (target) switching centre on the basis of a dialled directory number. If the signalling between the serving MSC and the target MSC supports the transmission of bearer capability information, the traffic channel parameters arriving from the MS in the format employed in the mobile network are forwarded to the IWF of the target MSC. If there is no signalling support available to the bearer capability information, the target MSC uses the default profile (user rate, character structure) according to the dialled directory number, in order to set up a traffic channel for the data access. Also in this case there may be several profiles for the data access, and each profile being assigned has a dedicated directory number. Another alternative in a situation where the call set-up signalling from the servicing MSC does not contain the bearer capability information is that the target MSC requests for this information from the serving MSC.

Since the UDI used in the invention is a bearer service also supported by the ISDN, the data calls according to the invention to a direct data access are not restricted to the mobile network. A data call may also originate from the ISDN or PSTN.

If an MSC comprising a centralized DDA is itself the serving MSC, both adaptation functions are performed in the same MSC, as in conventional systems.

BRIEF DESCRIPTION OF DRAWINGS

The invention will be described below by means of preferred embodiments with reference to the accompanying drawing, in which.

PREFERRED EMBODIMENTS OF THE INVENTION

The present invention is applicable for use in most digital mobile systems for providing a direct data access to a data network. The invention is especially applicable for use in the Pan-European digital mobile system GSM and in the corresponding digital systems, such as the DCS1800 and the GSM-based digital US mobile system PSC (Personal Communications System), and in the GSM-based satellite systems. The invention will be described below with the GSM mobile system as an example without restricting the invention thereto, however.

The basic components of the GSM system will be described shortly below with reference to FIG. 2, but it is not necessary to describe in greater detail the properties of the components or the other parts of the system in this application. For a more detailed description of the GSM system, reference is made to the GSM recommendations and to *The GSM System for Mobile Communications* by M. Mouly & M. Pautet (Palaiseau, France, 1992, ISBN: 2-9507190-0-7).

The structure of the GSM system is composed of two parts: the base station system BSS and the network subsystem NSS. The BSS and the MS communicate via radio links. In the BSS, each cell is served by a base station BTS (not shown in the figures). A number of base stations are connected to the base station controller BSC (not shown) the function of which is to control the radio frequencies and channels used by the BTS. The BSSs (to be more precise, the BSCs) are connected to the MSC. Certain MSCs are connected to other telecommunication networks, such as the PSTN, and they comprise gateway functions for calls to and from these networks. These MSCs are known as gateway MSCs (GMSC).

There are two basic types of databases that are related to call routing. There is a home location register HLR that stores the subscriber data of all the network subscribers either permanently or semi-permanently, including the information about the services to which the subscriber may have access and about the current location of the subscriber. The other register type is the visitor location register VLR. The VLR is usually connected to one MSC, but it may also service several MSCs. The VLR is generally integrated into the MSC. This integrated network element is known as the visited MSC (VMSC). Whenever a mobile station is active (registered and capable of making or receiving calls), most of the mobile subscriber data concerning the mobile station and maintained in the HLR will be copied into the VLR of the MSC in the area of which the mobile station is located.

Figure 2:
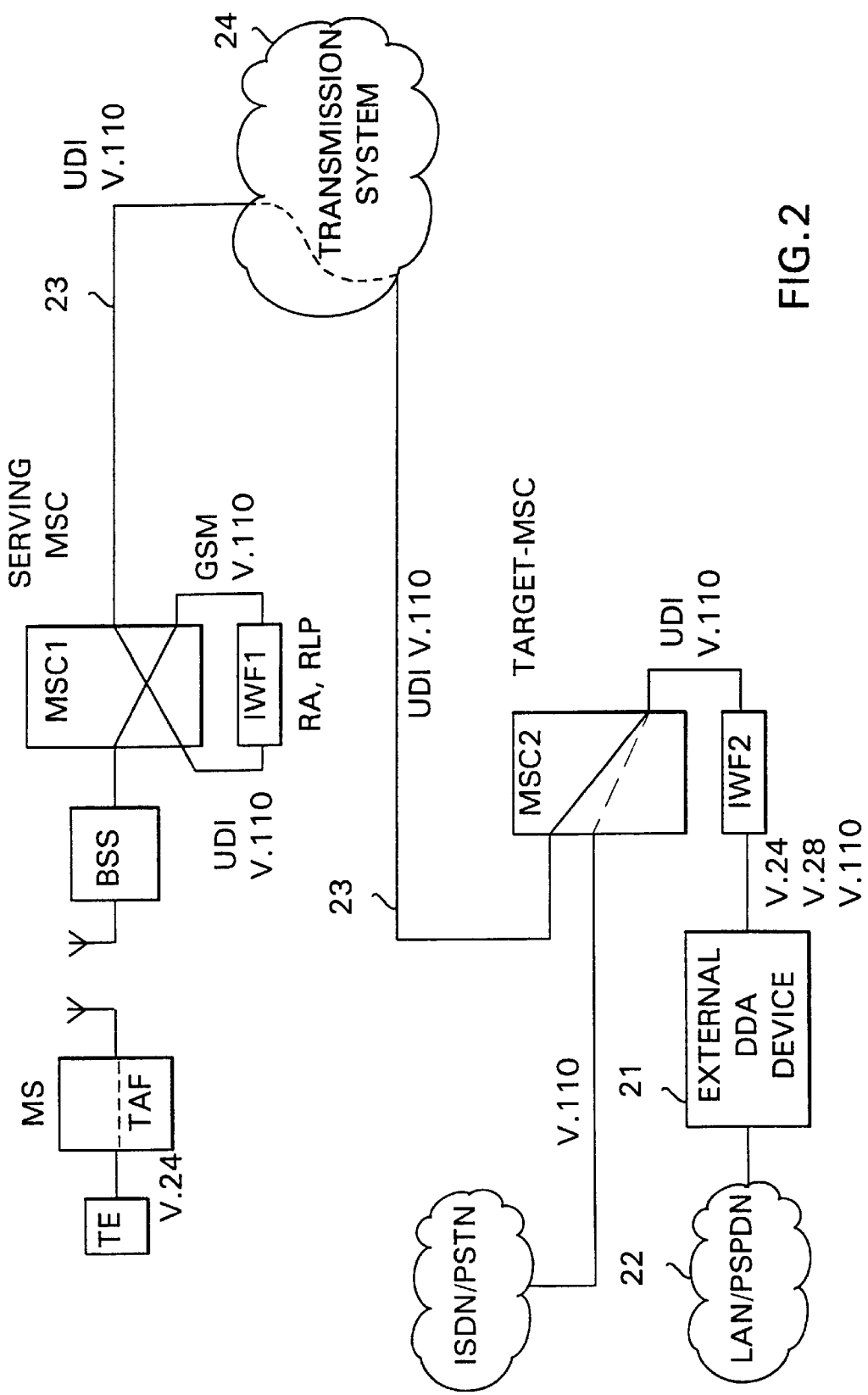
FIG. 2 illustrates the arrangement according to the invention for implementing a centralized direct data access (DDA) in a digital mobile system.

With further reference to FIG. 2, a data link is set up in the GSM system between the terminal adaptation function (TAF) in the mobile station and the interworking function 41 at the mobile network side. The data link for data transmission in the GSM network is a UDI-coded digital full duplex connection that is V.110-rate-adapted to V.24 interfaces. The V.110 connection is a digital transmission channel that was originally developed for the ISDN (Integrated Services Digital Network) technology. The V.110 connection is adapted to the V.24 interface and that also provides a possibility of transferring V.24 statuses (control signals). The CCITT recommendation for a V.110-rate-adapted connection is disclosed in the CCITT Blue Book: V.110. The CCITT recommendation for the V.24 interface is disclosed in the CCITT Blue Book: V.24. The TAF adapts the TE connected to the MS to the aforementioned V.110 connection that is established over a physical connection using one or more traffic channels. The IWF connects the V.110 data connection to another V.110 network, such as the ISDN or another GSM network, or to some other transit network, such as the PSTN. Also, the IWF may provide, as described above, a direct data access to the data network, such as the LAN or the packet-switched public data network (PSPDN). More precisely, the IWF provides an access to a DDA equipment in the data network, such as a LAN server or a PAD device, operating as a gateway to the data network.

Figure 1:
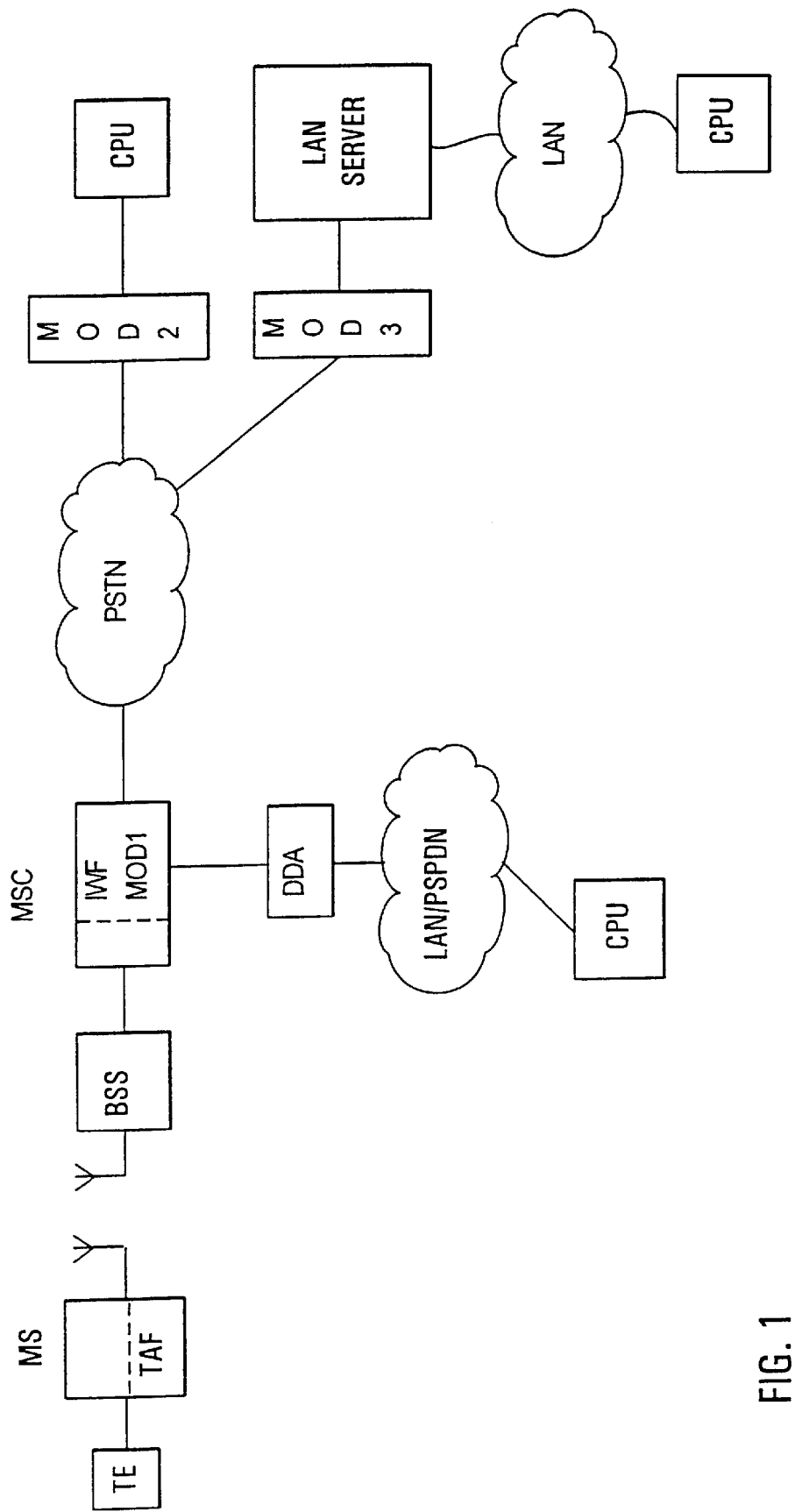
FIG. 1 illustrates a prior art digital mobile network wherein the invention can be applied for accessing to data networks.

As described above with reference to FIG. 1, it has conventionally been necessary to place the DDA equipment of the data network separately into each MSC, if the users of this data network were to be provided with a service covering the entire mobile network.

FIG. 2 illustrates a mobile system according to the invention wherein a DDA implemented in one MSC to the data network provides a service in the area of all the MSCs in the mobile network and even in distant networks where the users may roam. The mobile system of FIG. 2 is simplified for the sake of clarity to illustrate only two MSCs in a special situation where the centralized DDA has been implemented in MSC2 and the MS is in the area of MSC1. It should be understood, however, that there may be any number of MSCs and that each of them may comprise one or more DDAs to different data networks. Thus, for example in FIG. 1 the roles of MSC1 and MSC2 as the serving MSC and the target MSC may change so that the DDA for another data network is located in MSC1. It should also be noted that in cases where the same MSC is both the serving MSC and the target MSC, the DDA can be implemented by means of a conventional IWF.

In the invention, the conventional IWF functions are divided into two parts between the serving MSC (MSC1) and the target MSC (MSC2). The interworking function of the serving MSC is called IWF1 herein. Between the TAF of the MS and the IWF1 of the serving MSC1 there is a V.110 connection according to the GSM recommendations. IWF1 provides this data link with all the RA and RLP functions required by the GSM recommendations. In the preferred embodiment of IWF1 shown in FIG. 3, these GSM-specific functions are carried out in the data service adaptor DASA 31. The DASA 31 provides a V.24/V.28 interface as it is determined in the GSM recommendations. The RA functions are defined in the GSM recommendations 04.21 and 08.20. The RLP is defined in the GSM recommendation 04.22. Different TAF functions are also defined in the GSM recommendations 07.02 and 07.03. Different IWF functions are defined in the GSM recommendations 09.04, 09.05, 09.06 and 09.07.

Figure 3:
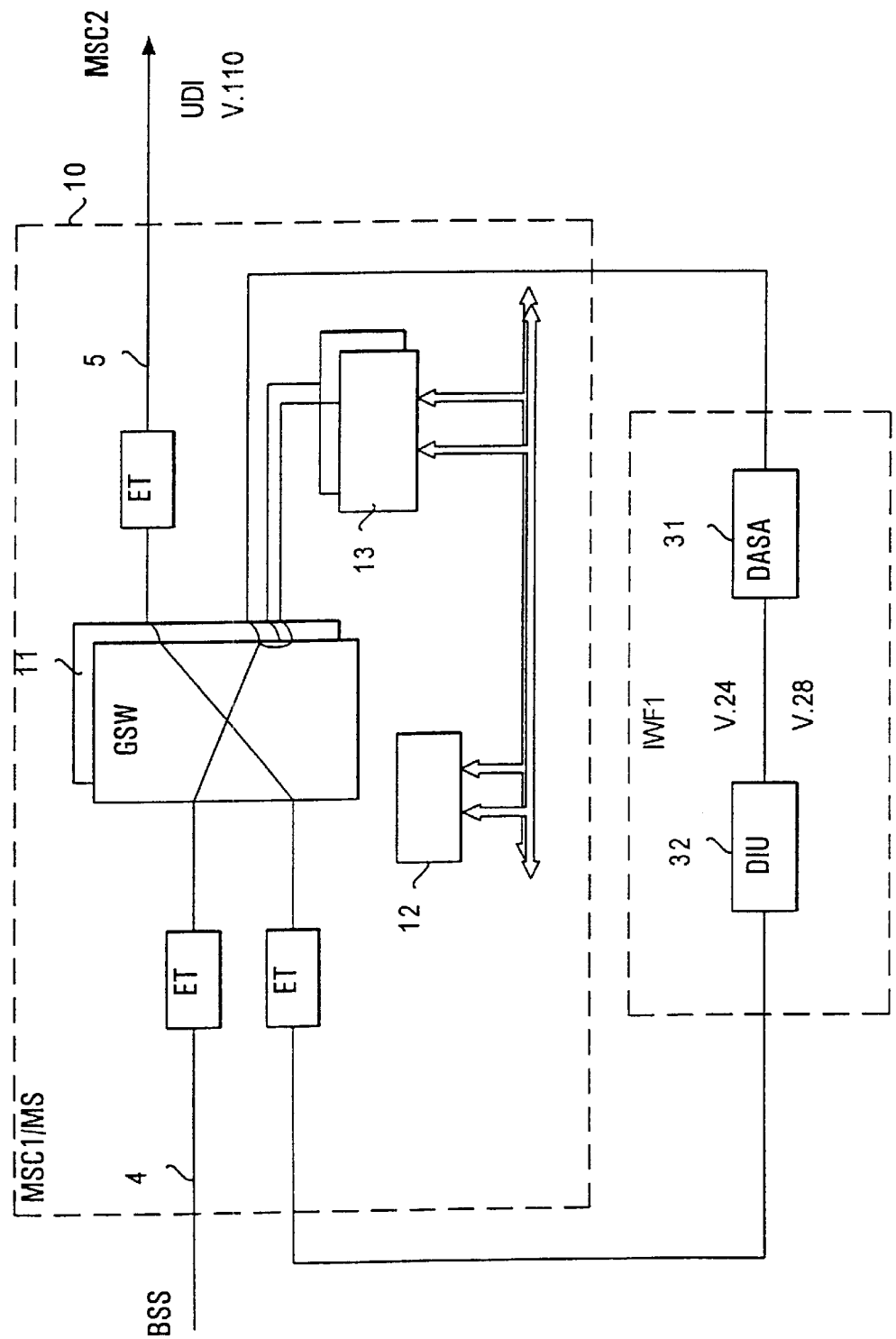
FIG. 3 shows a mobile switching centre with an interworking function IWF1 according to the invention.

FIG. 3 also shows, for the sake of illustration, some elements of a mobile switching centre: a group switch GSW 11, call control 12 and 13, and exchange terminations ET. The IWF is connected in parallel with the GSW in such a way that it is under control of the call control 12, 13 and it can be connected between the outgoing circuit 5 and the incoming circuit 4. In practice, the MSC contains a considerable number of different devices. An example of such digital switching centres is the DX 200 MSC of Nokia Telecommunications.

According to the basic idea of the invention, a data call is routed from the serving MSC1 to the target MSC2 as a call which is in accordance with a bearer service that is defined in the GSM recommendations and that is therefore in principle supported by each MSC. The different bearer services supported by the GSM system are defined in the GSM recommendation 02.02. In the UDI service the data is transferred entirely digitally from one end of the link to the other, i.e. without an analog link or an analog data modem in between. In order to set up an extended UDI connection between MSC1 and MSC2, the interworking function IWF1 of the serving MSC1 also contains the rate adaptations required by the UDI bearer service. The preferred embodiment of IWF1 shown in FIG. 3 comprises a data interface unit (DIU) 32 for adapting to the UDI service. The DIU adapts the user data arriving from a GSM traffic channel and the status and control information to the ISDN V.110 frame structure that is employed in the UDI transmission on the digital data link provided between MSC1 and MSC2 by the transmission system 24, such as the ISDN. Correspondingly, the DIU 32 adapts to the GSM traffic channel the user data that arrives from the data link 23 and that has been rate-adapted according to the ISDN V.110 recommendation, and the status and control data according to the V.110 recommendation.

As it is apparent on the basis of the above, IWF1 of the serving MSC is in fact a conventional IWF that is used in data calls supporting the UDI bearer service. In fact, from the serving MSC point of view the DDA call according to the invention is a normal asynchronous data call that employs the UDI bearer service. The novel characteristic according to the invention is that a UDI call is routed, instead of routing to the ISDN, to the target MSC, and more precisely to another interworking function IWF2 located therein and providing the centralized DDA to the desired data network. The call establishment and routing according to the invention will be described in greater detail below.

The other part of the IWF divided according to the invention is located in the target MSC (MSC2) and it is called IWF2 herein. IWF2 contains adaptation functions that adapt the UDI bearer service employed in the data link 23 to the V.24/V.28 interface. This interface is a DDA to which an external DDA device 21 is connected. Therefore the adaptation function of IWF2 is practically the same as that of the DIU 32 in FIG. 3. In other words, IWF2 adapts to the V.24/V.28 interface the ISDN-type user data that has been rate-adapted according to the V.110 recommendation and that arrives from the digital data link 23, and the status and control information of the V.110 recommendation, and vice versa it adapts the user data and status and control information from the V.24/V.28 interface to an ISDN V.110 frame structure.

Figure 4:
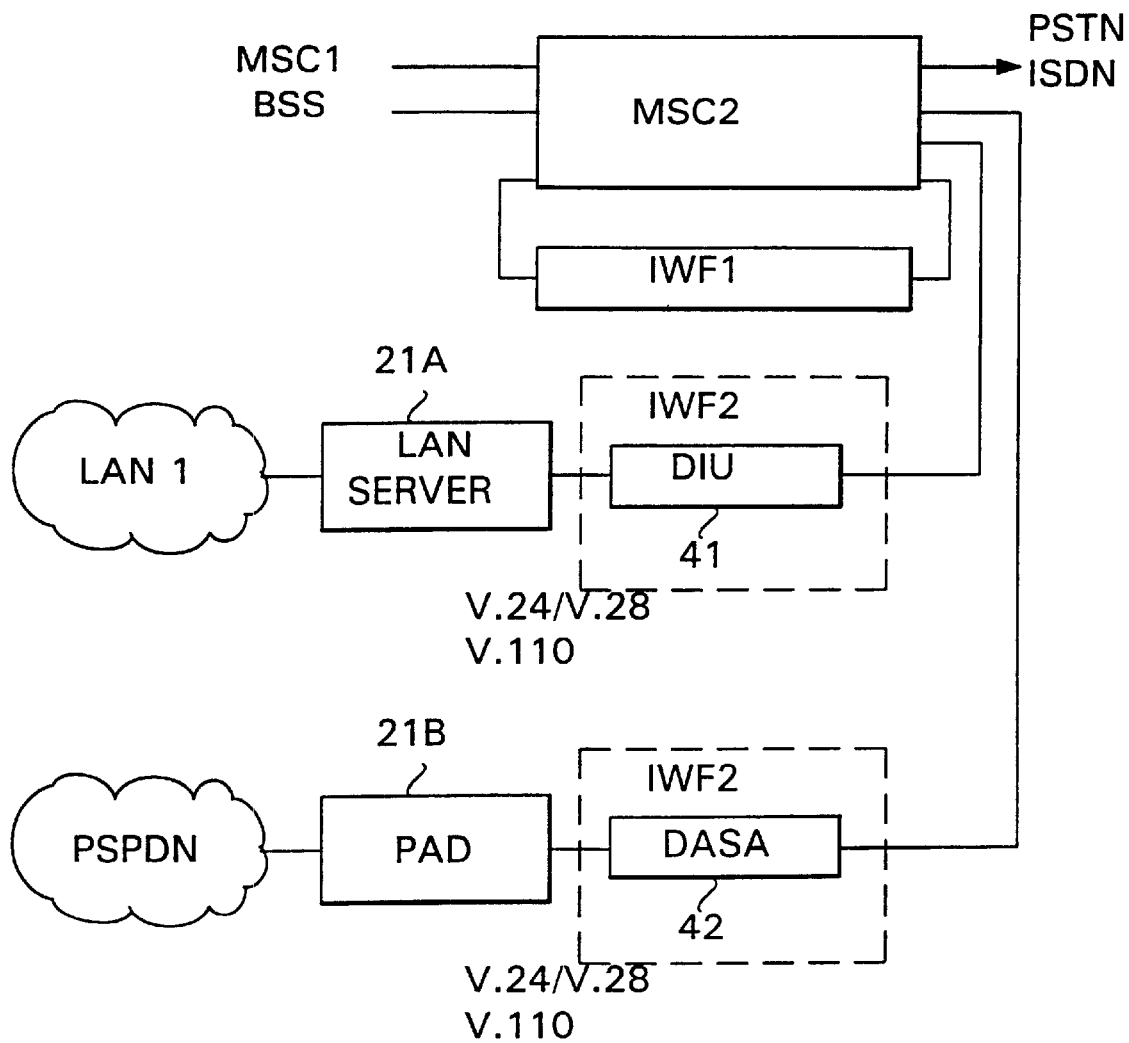
FIG. 4 shows a mobile switching centre according to the invention, comprising both the interworking function IWF2 according to the invention and the centralized data access to the data network.

FIG. 4 shows two alternative manners of implementing IWF2. In the first embodiment, IWF2 consists of a data interface unit DIU 41 that is implemented in the same way as the DIU 32 in FIG. 3. The drawback of this implementation is that it only supports DDA calls routed from another MSC or ISDN. "Local" DDA calls arriving from an MS served by the same MSC must then be provided with a separate DDA. In the other embodiment shown in FIG. 4, IWF2 consists of a data service adaptor 42 that can be configured to perform the functions of the data service adaptor 31 of FIG. 3 for the "local" DDA calls and the functions of the data interface unit 41 for DDA calls routed from other MSCs. The adaptation functions that the DASA 42 uses for each particular call are determined by the call control 12, 13 of the MSC. All the DDA calls can then be processed with the same IWF2 adapter equipment.

In FIG. 4, a LAN server 21A is connected to the DDA (V.24/V.28 interface) of the DIU 41, the LAN server being in turn connected to a local area network LAN1. Correspondingly, PAD 21B is connected to the DDA (V.24/V.28 interface) of the DASA 42 as the external DDA device, the PAD being in turn connected to the PSPDN.

FIG. 4 shows two IWF2 apparatuses and a DDA. As stated above, any MSC of the mobile network can comprise an arbitrary number of centralized DDAs to different data networks. The MSC of FIG. 4 also comprises one IWF1 enabling the routing of a DDA call from the area of MSC2 to a DDA in another MSC (e.g. MSC1). Even though in the above examples the DDA is a V.24/V.28 interface, other types of interfaces are also possible. Examples of other interfaces include 30B+D (DSS1) and ISUP. The ISUP is defined in the recommendation Q.761 CCITT Blue Book/ ETS 300 356-1. The interface 30B+D is defined in the recommendation Q.931/ETS 300 102-1. The adaptation functions of IWF2 should also be arranged to support such a DDA.

It should be noted in general that the exact implementation of the adapters IWF1 and IWF2 is not essential to the invention, nor is the type of the interfaces and data links between which the network adaptation is provided. For example IWF1, IWF2 and IWF1+IWF2 may be one and the same equipment where the adaptation functions are implemented by means of software so that the call control determines the adaptation to be used in each case. The only essential feature for the invention is that IWF1 carries out the adaptation functions required by the mobile network in the serving MSC, the target MSC performs the adaptation functions required by the centralized DDA, and both IWF1 and IWF2 support the bearer service required by the digital data link between them.

The DDA call set-up and routing according to the invention will be described in greater detail below in the mobile network of FIG. 2.

Assume that the home LAN of subscriber A is connected to the interworking function IWF2 of MSC2 via a DDA. The DDA is assigned the directory number B# (an ISDN number according to E.164). Assume further that when roaming in the area of MSC1, subscriber A makes a UDI data call to the directory number of the DDA connected to his home LAN. The call set-up message transmitted by the mobile station MS of subscriber A contains the directory number B# and the bearer capability information element of the GSM system (GSM BCIE). The BCIE is an information element wherein data is transferred both in the GSM system and in the ISDN about all the network requirements related to the call, such as user rates, the number of data and stop bits, etc. The BCIE is described for example in the GSM specification 04.08, version 4.5.0, pp. 423–431. In a DDA call according to the invention, the bearer service code of the BCIE is the same as in a corresponding UDI call to the ISDN. Therefore the DDA calls to be routed forward are seen in the serving MSC (MSC1) as normal asynchronous UDI calls. Therefore the call set-up also proceeds in the same manner as in a conventional UDI call.

MSC1 first converts the GSM BCIE into a basic service code. Thereafter MSC1 performs a subscriber data request to the VLR, the request also containing the basic service code. The subscriber data of the VLR contains the basic service codes allowed to subscriber A. The VLR checks whether the subscriber has the right to the basic service requested for the call, and if so, it transmits the required subscriber data to MSC1.

MSC1 allocates the IWF equipment, i.e. IWF1, supporting the UDI bearer service, and routes the call as an ISDN UDI call towards MSC2 on the basis of the dialled directory number B#. The routing of the DDA call requires support for the UDI transfer between MSC1 and MSC2. In other words, a data transmission capacity of 64 kbit/s is required over the entire path between the MSCs.

In the target MSC (MSC2) the calls routed from another MSC are seen as terminating DDA calls from the PSTN/ ISDN. MSC2 analyzes the directory number B# which is signalled by MSC1 in connection with routing, and routes the incoming ISDN UDI call to the DDA according to the directory number B#, the DDA being connected to the home LAN of subscriber A.

The target MSC (MSC2) must be able to allocate the correct IWF resource, i.e. IWF2, and to set the traffic channel parameters of IWF2 in accordance with the parameters used by the calling subscriber A. There are two manners of obtaining the parameters: signalling and default parameters.

If the signalling between MSC1 and MSC2 supports the transmission of bearer capability information, the traffic channel parameters arriving in the GSM format from the calling MS are transmitted to the interworking function IWF2 of MSC2. In this case the calling party can always define the desired traffic channel parameters.

The signalling supported between MSC1 and MSC2 may be for example ISUP signalling, NUP signalling, DPNSS signalling or any other corresponding signalling. The NUP is defined in the recommendation BTRN 167. The DPNSS is defined in the recommendation BTRN 188.

In the ISUP signalling, the ISDN BCIE that has been converted from the GSM BCIE received from the MS is forwarded from MSC1 in the user service information (USI) field. This conversion is a normal function of an MSC when signalling towards the ISDN. Also, it is possible to transmit LLC (Low Layer Compability) and HLC (High Layer Compability) in the ISUP signalling if they were also included in the set-up message transmitted by the MS. The ISDN BCIE, LLC and HLC are defined in the CCITT Blue Book Q.931: Bearer Capability Information Element.

In the NUP and DPNSS signalling, it is possible to use the SIM (service information message) protocol to transfer the traffic channel parameters in the SIC (service identification code) information element that is an information field corresponding to the ISDN BCIE. The SIC can be converted into ISDN BCIE in the target MSC (MSC2).

The signalling support for transferring the bearer capability information between MSC1 and MSC2 is not an absolute requirement for DDA call routing according to the invention. If the bearer capability information (ISDN BCIE, SCI or the like) is not transmitted, MSC2 uses for setting up a traffic channel the default profile corresponding to the dialled number B#, the profile being stored in the files of MSC2. A default profile consists of the default parameters of the traffic channel, for example the user rate and character structure. A default profile may therefore be an ISDN BCIE, GSM BCIE or the like that is permanently related to the directory number B# of the DDA. The calling party must then use exactly the same traffic channel parameters as the default parameters. At least the user rate, number of data bits and stop bits, parity and the synchronous/asynchronous data must match. A DDA may have several profiles each of which has a different directory number.

Both of the above-described methods for determining traffic channel parameters can be used. In such a case, the bearer capability information obtained during signalling from MSC1 is used primarily, and only in the absence of this information the default parameters related to the directory number B# are used.

When IWF2 has been configured, MSC2 connects it to the link. This information is signalled to MSC1, which connects both IWF1 and the MS to the link. The data transmission between the TE and the external DDA device can thereafter begin.

It should be noted that DDA calls are not restricted to the GSM network. A routed DDA call may also originate from the ISDN/PSTN, in which case MSC2 operates as described above.

The figures and the description related thereto are only intended to illustrate the present invention. The details of the invention may vary within the scope and spirit of the appended claims.

What is claimed is:

1. An apparatus for implementing a direct data access from a digital mobile network to a data network, such as a packet network or a local area network, comprising:

a direct data access to a data network implemented in a centralized manner in a first switching centre of a mobile network, a directory number allocated to the direct data access, a second switching centre for routing a data connection, originating from a mobile station situated within the service area of the second switching centre to said directory number, to said first switching centre as a digital data call connection according to a digital bearer service supported by the mobile network, interworking functions for said routed data call connection being divided between the first and the second switching centre in such a way that said first switching centre comprises a first interworking function that provides adaptation functions required by said direct data access and said digital bearer service, and said second switching centre comprises a second interworking function that provides adaptation functions required by a data link established over a radio path and the adaptation functions required by said digital bearer service.

2. The apparatus according to claim 1, wherein said digital bearer service is unrestricted digital information.

3. The apparatus according to claim 1, wherein the first switching centre analyzes the directory number signalled by the second switching centre during routing, and to route an incoming data call to the centralized data access according to said directory number.

4. The apparatus according to claim 1, wherein
the signalling between the switching centres supports the transmission of bearer capability information,
the second switching centre forwards to the first switching centre traffic channel parameters received from the calling mobile station,
the first switching centre sets traffic channel parameters of the first interworking function in accordance with said signalled parameters.

5. The apparatus according to claim 4, wherein said signalling is ISUP signalling and that said bearer capability information is ISDN BCIE located in the USI field, and possibly LLC or HLC.

6. The apparatus according to claim 4, wherein said signalling is NUP or DPNSS signalling employing SIM protocol to transfer the traffic channel parameters in a SIC information element.

7. The apparatus according to claim 1, wherein
the signalling between the switching centres does not support the transmission of bearer capability information,
the first switching centre contains a file storing default values of traffic channel parameters related to said directory number.

8. The apparatus according to claim 2, wherein
the first switching centre forwards to said centralized data access UDI calls that have been made from a public switched telephone network, ISDN or a switching centre to said directory number.

9. The apparatus according to claim 2, wherein the first switching centre analyzes the directory number signalled by the second switching centre during routing, and to route an incoming data call connection to the centralized data access according to said directory number.

10. The apparatus according to claim 2, wherein the signalling between the switching centres supports the transmission of bearer capability information,
the second switching centre forwards to the first switching centre traffic channel parameters received from the calling mobile station,
the first switching centre sets traffic channel parameters of the first interworking function in accordance with said signalled parameters.

11. The apparatus according to claim 3, wherein the signalling between the switching centres supports the transmission of bearer capability information,
the second switching centre forwards to the first switching centre traffic channel parameters received from the calling mobile station,
the first switching centre sets traffic channel parameters of the first interworking function in accordance with said signalled parameters.

12. The apparatus according to claim 9, wherein the signalling between the switching centres supports the transmission of bearer capability information, the second switching centre forwards to the first switching centre traffic channel parameters received from the calling mobile station, the first switching centre sets traffic channel parameters of the first interworking function accordance with said signalled parameters.

13. The apparatus according to claim 10, wherein said signalling is ISUP signalling and that said bearer capability information is ISDN BCIE located in the USI field, and possibly LLC or HLC.

14. The apparatus according to claim 11, wherein said signalling is ISUP signalling and that said bearer capability information is ISDN BCIE located in the USI field, and possibly LLC or HLC.

15. The apparatus according to claim 12, wherein said signalling is ISUP signalling and that said bearer capability information is ISDN BCIE located in the USI field, and possibly LLC or HLC.

16. The apparatus according to claim 10, wherein said signalling is NUP or DPNSS signalling employing SIM protocol to transfer the traffic channel parameters in a SIC information element.

17. The apparatus according to claim 11, wherein said signalling is NUP or DPNSS signalling employing SIM protocol to transfer the traffic channel parameters in a SIC information element.

18. The apparatus according to claim 12, wherein said signalling is NUP or DPNSS signalling employing SIM protocol to transfer the traffic channel parameters in a SIC information element.

19. The apparatus according to claim 2, wherein the signalling between the switching centres does not support the transmission of bearer capability information, the first switching centre contains a file storing default values of traffic channel parameters related to said directory number.

20. The apparatus according to claim 3, wherein the signalling between the switching centres does not support the transmission of bearer capability information, the first switching centre contains a file storing default values of traffic channel parameters related to said directory number.

\* \* \* \* \*